April 11, 1967 R. A. LASLEY ETAL 3,313,302

CARD REMOVAL APPARATUS

Filed April 16, 1965 3 Sheets-Sheet 1

INVENTORS
Robert A. Lasley
Siegfried K. Handel
BY
Wood, Herron and Evans
ATTORNEYS April 11, 1967 R. A. LASLEY ETAL 3,313,302

CARD REMOVAL APPARATUS

Filed April 16, 1965 3 Sheets-Sheet 2

INVENTORS
Robert A. Lasley
Siegfried K. Handel
BY
Wood, Herron and Evans
ATTORNEYS

CARD REMOVAL APPARATUS

Filed April 16, 1965

INVENTORS
Robert A. Lasley
Siegfried K. Handel
BY
Wood, Herron and Evans
ATTORNEYS 3,313,302
CARD REMOVAL APPARATUS Robert A. Lasley and Siegfried K. Handel, Hamilton, Ohio, assignors to The Mosler Safe Company, Hamilton, Ohio, a corporation of New York Filed Apr. 16, 1965, Ser. No. 448,685
12 Claims. (Cl. 129—16.1)

This invention relates in general to an apparatus for facilitating the removal of a selected file card from a deck of such cards, and more specifically to a novel apparatus for both positively preventing the removal of any non-selected cards along with the selected one and for ensuring that the card is physically disengaged from the selecting mechanism before its final removal is initiated.

This invention is particularly, although by no means exclusively, adapted to be used in connection with a card filing system of the type disclosed in application Ser. No. 279,260, filed May 9, 1963, now Patent No. 3,225,770, and assigned to the same assignee as the present invention, and the specification of said application is incorporated herein by reference. Essentially, the card filing system of the above application comprises a rotatable storage drum having a plurality of open pockets or compartments disposed around its outer periphery. Each pocket contains a deck of file cards and any one of the pockets may be indexed to an access station for individual card file removal and/or insertion. The cards are each coded by means of notches cut into their upper edges, and a row of extensible fingers is provided at an access station for implementing the removal of a desired card from its deck. In operation, the pocket containing the desired card is first indexed to the access station. Two of the fingers whose positions correspond to the notches in the card are then extended over the top of the deck. Following this a stream of high pressure air is scanned across the bottom of the deck through an opening in the pocket. The air stream passes up through the cards and its laminar drag across their surfaces tends to pull each card out of the pocket. The extended fingers hold down all but the desired card, however, and only the latter is free to move into the fingers to the depth of the notches. The extended fingers are then retracted and the card is drawn out of the deck and conveyed to a viewing station by a drive roller transport mechanism.

Two problems have arisen in connection with the described card filing system. The first one relates to the tendency for one or more additional cards or doubles to be drawn out of the deck along with the desired card due to static or surface adhesion between the adjacent cards in the deck. To prevent such card jams and to avoid the resulting correction delays and card damage, the system of the above application provides a pair of plenum chambers positioned adjacent the access station on either side of the drive rollers. The chambers have outlet nozzles which issue downwardly directed streams of air against the sides of the card being withdrawn, and these air streams serve to avoid scratching of the surface and to strip any adhering cards off the selected one and return them to the deck. While this air stripping technique is effective in most instances to prevent such doubles, they still occur on occasion, and in some situations even one double in a thousand removal cycles is unacceptable.

The second problem concerns the tendency of the extended fingers to become tightly wedged into the notches of a selected card that has been raised out of the deck by the ejecting air stream. This occurs as a result of cards being driven into tight engagement with the fingers due to their momentum caused by the air stream and held there by adjacent cards or by the drive rolls of the transport mechanism. In any event, it either prevents the fingers from being retracted or results in card tearing or damage when the fingers are withdrawn.

It is accordingly, a primary object of this invention to provide an apparatus for effectively overcoming the above-described problems by positively precluding the possibility of doubles or non-selected card removal and by ensuring that a raised card is fully disengaged from the selection fingers before the latter are retracted.

It is a further object of this invention to provide a novel apparatus for implementing the above functions which employs slotted stripper blades for preventing doubles. The stripper blades permit the selected card to be withdrawn and retain all other unselected cards in the deck.

It is a further object of this invention to provide means completely automatic in operation, and which will return all partially removed cards to the deck upon the detection of a doubles condition.

It is a further object of this invention to provide such an apparatus which employs microswitch sensing means to detect the presence of one or more raised cards and which features a transistor controlled relay circuit for both extending and retracting the slotted stripper blades, for effecting the incremental reversal of the drive rollers to break any wedge conditions and for completely reversing the drive rollers to return all cards in case of a double.

The foregoing and other objects, features and advantages of the invention will be readily apparent to those skilled in the art from the following more detailed description of a preferred embodiment of the invention as illustrated in the accompanying drawings, in which.

Figure 1:
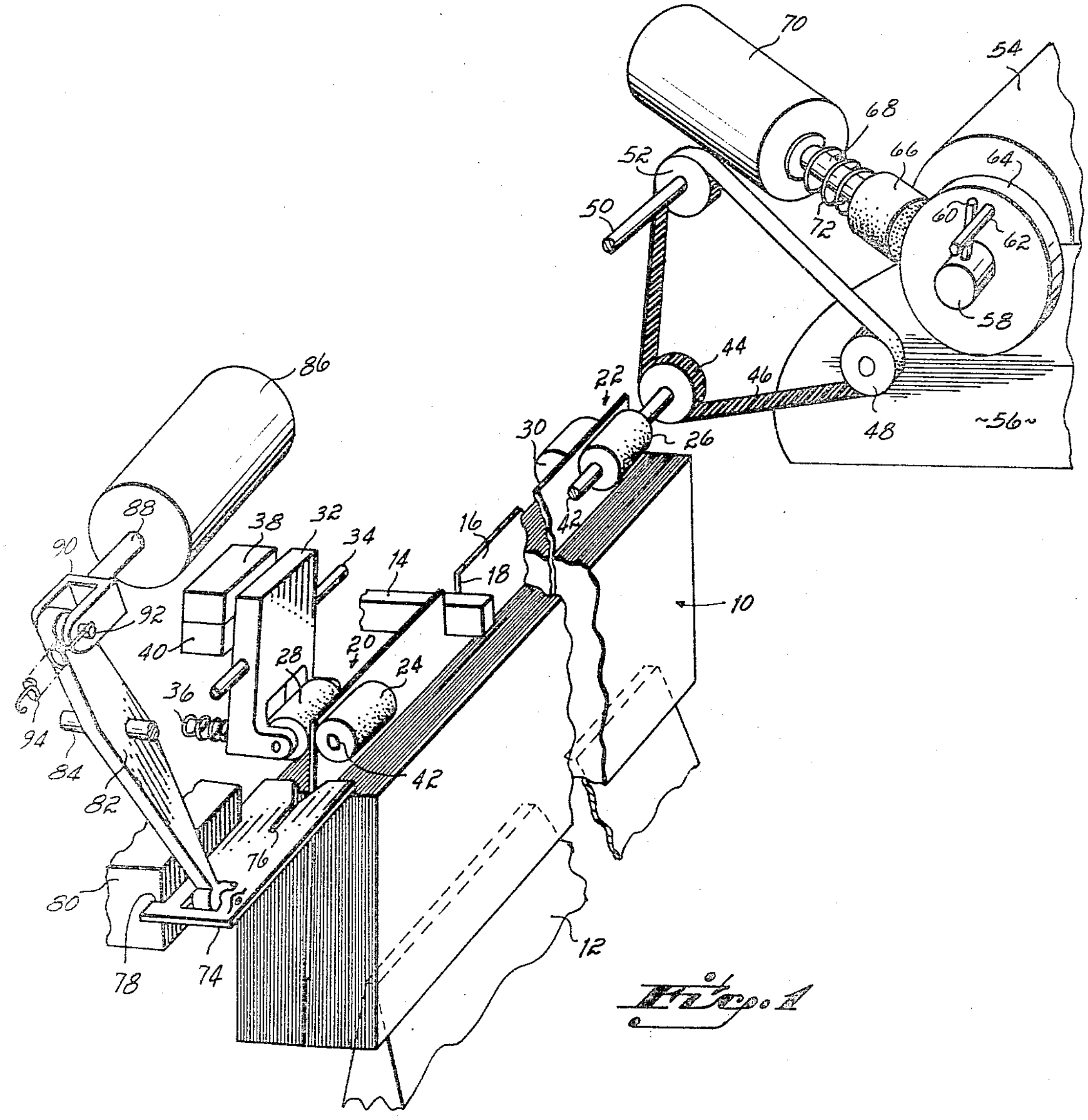
FIGURE 1 shows a perspective view of the card removal apparatus of the invention with a desired file card raised out of a deck and engaged with a selection finger.
Figure 5:
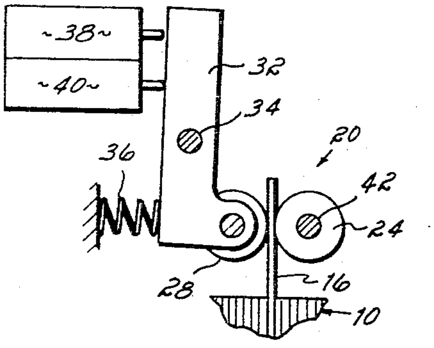
FIGURES 5 and 6 show side views of a pivoted idler roller mounting block and microswitch arrangement for and sensing the raising of one or more cards out of the deck.
Figure 6:
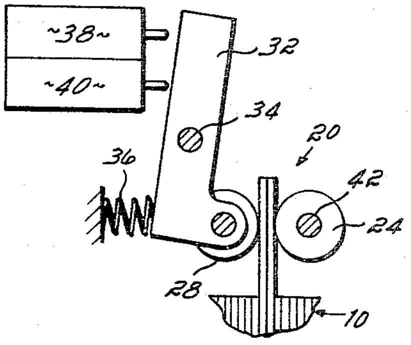

Referring now to the drawings, in which the same reference numerals have been used throughout the various figures to designate the same structural elements, FIGURE 1 shows a deck of file cards 10 positioned over an elongated air ejection nozzle 12. Although the cards are actually contained in one of the storage pockets on a rotatable drum in the card filing system disclosed in the above application, the complete structure of same has not been shown in the drawings in the interest of simplicity. A selection finger(s) 14 is in an extended position over the top of the deck of cards and a desired card 16 has been raised out of the deck by the air ejection stream until the bottom of a coding notch 18 in its upper edge has engaged the extended finger. At this point the opposite corners of the card have entered between drive roller pairs 20 and 22 of a reversible transport mechanism the complete details of which have been omitted from the drawings to avoid unnecessary confusion. The drive roller pairs include driving rollers 24 and 26 respectively cooperating with driven or idler rollers 28 and 30. The idler roller 28 is journaled for free rotation in a mounting block 32 which is itself rotatable to a limited degree about a horizontal axis defined by a pivot shaft 34. The lower end of the block 32 is urged toward the driving roller 24 by a helical expansion spring 36 to ensure proper card contact by the friction surfaces of the rollers. A pair of microswitches 38 and 40 are positioned adjacent the upper half of the mounting block 32, as more clearly shown in FIGURES 5 and 6, to sense the raising of one or more cards out of the deck 10. The externally projecting actuating pins of the switches are spring biased outwardly and the switches are adjusted so that when a single card enters between driving roller 24 and idler roller 28 only the upper switch 38 is actuated, as shown in FIGURE 5. On the other hand, when two or more cards enter the transport mechanism, as illustrated in FIGURE 6, the increased total thickness of the cards causes the mounting block 32 to pivot to a greater degree, and this in turn results in the actuation of both of the microswitches 38 and 40.

The driving rollers 24 and 26 are secured to a shaft 42 provided with an axially grooved pulley wheel 44 on one end. This wheel is driven by a transversely grooved belt 46 from a driving pulley wheel 48, and the belt also drives an upper shaft 50 through a pulley wheel 52. The upper shaft carries a further pair of drive rollers, not shown, which are part of the overall transport mechanism. The driving pulley wheel 48 is driven by a reversible, split phase A.C. motor 54 through a transmission box 56. The rotor shaft 58 of the motor carries a radial pin 60 which cooperates with a pin 62 extending in an axial direction from a brake disc 64 rotatably mounted on the shaft 58. The brake disc may be restrained by a brake shoe 66 mounted on the armature 68 of an electric solenoid 70 and urged against the disc by a helical expansion spring 72. The disc is free to rotate only when the solenoid is energized and holds the shoe out of engagement with the disc.

A stripper blade 74 provided with a longitudinal slot 76 in one end is positioned adjacent the top of the deck of file cards 10. The slot is always wider than the thickness of one file card but narrower than the thickness of two, so that only a single card may be accommodated in the slot and pass through the blade, and the mouth of the slot is divergent or funnel shaped to facilitate the entry of a card. The blade is loosely mounted in a horizontal groove 78 in a guide block 80 and may be reciprocated by a crank arm 82 pivoted about a shaft 84 under the control of an electric solenoid 86. The loose mounting feature permits the blade to align itself transversely with a raised card when the blade is extended over the top of the deck. This prevents any binding between the card and the slot which might otherwise result in the tearing of the card when the latter is pulled through the slot by the transport mechanism. The solenoid armature 88 is connected to the top of the crank arm by a U-shaped link 90 and wrist pin 92, and the latter is also engaged by a helical compression spring 94. With such an arrangement the spring biasing tends to extend the stripper blade over the top of the deck of file cards and the blade is held in the retracted position shown in FIGURES 1 and 2 only when the solenoid 86 is energized.

Figure 7:
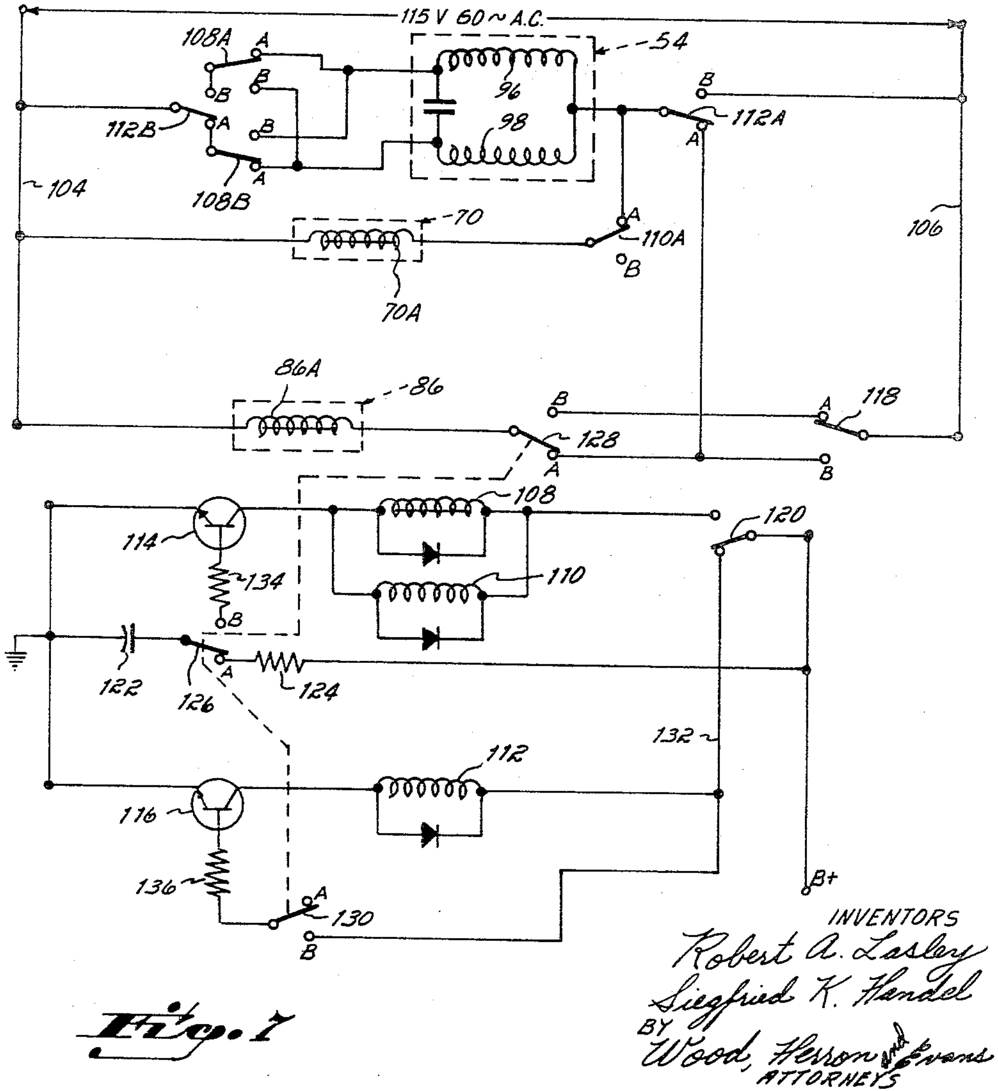
FIGURE 7 shows a schematic diagram of the transistorized relay circuit of the invention for controlling the stripper blade movement and transport mechanism reversal functions.

Having thus completed a description of the mechanical aspects of the invention, we may turn now to the electrical control circuit shown in FIGURE 7, which may conveniently be explained in conjunction with an operational description of the invention. Essentially, the control circuit consists of an A.C. section and a D.C. section. The former includes capacitively split phase windings 96 and 98 for the drive motor 54 and coils 70A and 86A for solenoids 70 and 86, respectively, connected between a pair of A.C. buses 104 and 106, while the latter comprises a network of relay coils 108, 110 and 112 and associated control transistors 114 and 116 connected between a 24-volt D.C. power supply, shown as B+, and ground. All of the switches in the control circuit of FIGURE 7 are shown in the positions they normally occupy when the card filling system is not in use and both the A.C. and D.C. power supplies are disconnected.

Considering now the operation of the apparatus for a normal card selection and removal cycle, the power supplies are first connected into the circuit as shown and switches 118 and 120 are transferred from engagement with their A contacts into engagement with their B contacts during the storage pocket scanning function or portion of the machine cycle. In actuality these switches are transferred automatically when the air stream is turned on from the nozzle 12 initiating a search for the desired card in the deck of cards 10. However, for purposes of this invention, these switches may be assumed to be manually actuated or transferred. The transfer of switch 118 both energizes the phase windings 96 and 98 of the drive motor 54 causing the latter to rotate in the forward or clockwise direction, and energizes coil 86A of stripper blade solenid 86 through switch 128 and coil 70A of brake solenoid 70 through switch arms 110A and 112A. The energization of the two solenoid coils pulls in the armatures 68 and 88 in FIGURE 1, which releases the brake disc 64 for rotation and retracts the stripper blade 74 from its extended position over the top of the card deck 10.

When the D.C. power supply is turned on a capacitor 122 is positively charged to a level of 24 volts through a resistor 124 and a switch 126.

Figure 2:
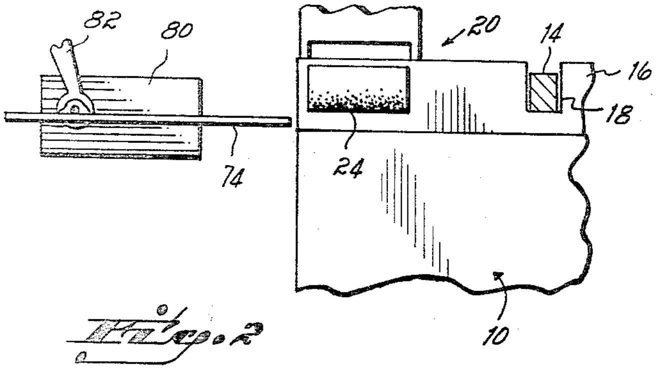
FIGURE 2 shows a side view of the retracted stripper blade and card position pictured in FIGURE 1.
Figure 3:
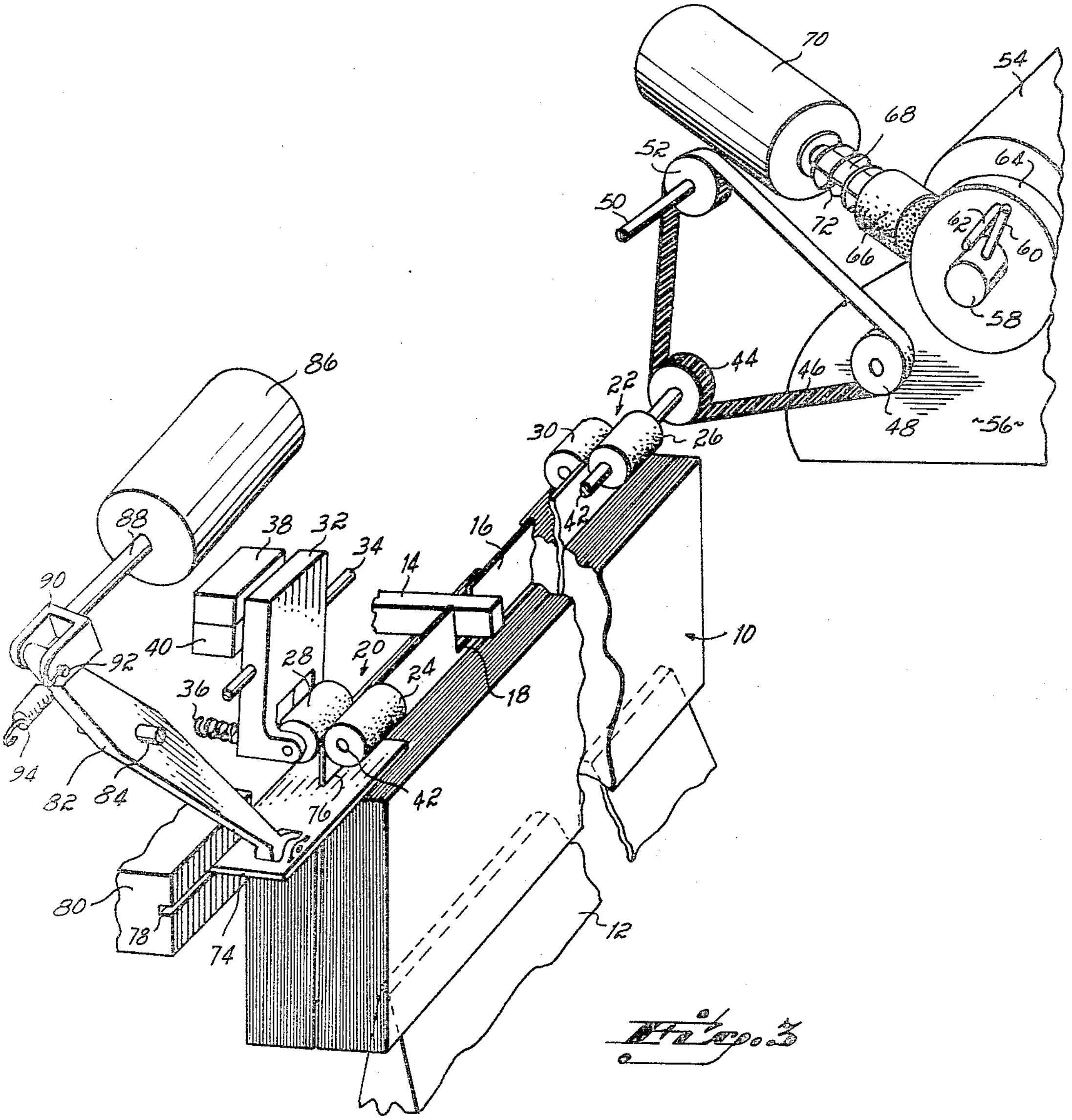
FIGURE 3 shows a perspective view of the apparatus after the raised card has been partially driven back into the deck by the incremental reversal of the transport mechanism.
Figure 4:
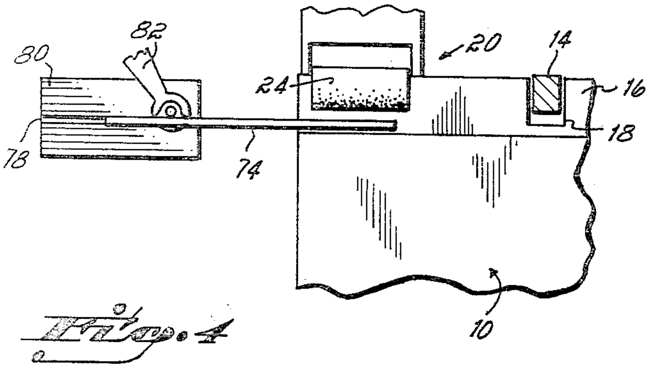
FIGURE 4 shows a side view of the extended stripper blade and card position pictured in FIGURE 3.

As soon as a desired card is raised out of the deck by the air ejection stream and enters the lower drive roller pairs 20 and 22 as shown in FIGURES 1 and 2, microswitch 38 is actuated, as may be seen in FIGURE 5. This microswitch energizes a relay coil, not shown, which transfers the ganged switches 126, 128, 130 from engagement with their A contacts into engagement with their B contacts. The transfer of switch 130 has no effect on the circuit as long as only a single card is raised out of the deck because line 132 was previously disconnected from the D.C. power supply by the transfer of switch 120. The transfer of switch 128 de-energizes the solenoid coil 86A of stripper blade solenoid 86 which permits spring 94 to extend the stripper blade 74 over the top of the card deck, and the desired card 16 now enters the slot 76 in the blade as shown in FIGURES 3 and 4. Since the slot is narrower than the thickness of two file cards, it positively prevents the subsequent withdrawal of more than the desired card from the deck, and serves to strip off any adhering, non-selected cards and hold them in the deck. When switch 126 transfers, the positive charge built up on capacitor 122 is applied to the base of NPN transistor 114 through a resistor 134. This forward biases the base-emitter junction of the transistor and renders it heavily conductive, thereby completing a circuit path from the D.C. power supply to ground through the relay coils 108 and 110. Both of these relay coils, as well as relay coil 112, are shunted by diodes poled as shown to permit the inductive energy stored in the coils to dissipate through them once they are de-energized.

The energization of relay coil 110 transfers its associated switch arm 110A which opens the circuit path through coil 70A of the brake solenoid 70. This releases armature 68 and allows spring 72 to extend the brake shoe 66 into peripheral contact with the brake disc 64, thereby halting the latter in its present position on the armature shaft 58. At the same time, relay coil 108 transfers its switch arms 108A and 108B from engagement with their A contacts into engagement with their B contacts, which reverses the direction of rotation of the drive motor 54 by establishing an opposite phase sequence in the windings 96 and 98. The motor now rotates in a counterclockwise direction for approximately 320° until the radial pin 60 carried on the armature shaft 58 strikes the pin 62 extending from the restrained brake disc 64, as shown in FIGURE 3. This incremental reverse rotation drives the raised card 16 back into the deck 10 to a slight degree, as seen more clearly in FIGURE 4, which breaks any wedge conditions that may exist between the bottom of the extended selection finger(s) 14 and the card notch(es) 18, thereby permitting the free withdrawal of the finger(s) without any tearing or damage to the card. The exact amount of card back-off is determined by the reduction gear ratio of the transmission box 56 and by the radial dimensions of the pulley wheels 44 and 48.

By this time capacitor 122 has discharged through transistor 114 to the point where the latter is increasingly less conductive. The parameters of relay coils 108 and 110 are chosen so that coil 108 requires a greater voltage drop across it to remain energized than does coil 110. As the conduction of transistor 114 begins to drop off, relay coil 108 will therefore be de-energized before relay coil 110. When switch arms 108A and 108B retransfer into engagement with their A contacts, the transport mechanism drive motor 54 resumes its clockwise rotation, but is free to do so for only 320° until the pins 60 and 62 engage each other on the opposite sides again as shown in FIGURE 1. Shortly thereafter the relay coil 110 drops out, its switch arm 110A retransfers into engagement with its A contact and the brake solenoid 70 is again energized to release the brake disc 64. The motor 54 now continues to rotate in the forward or clockwise direction and drives the desired file card 16 completely out of the deck and into a viewing station where further handling or reading operations may be performed. It should also be noted that the air supplies for the plenum chambers (not shown) positioned above the drive roller pairs 20 and 22 are turned on as soon as a card enters the transport mechanism. The downwardly directed air streams issuing from the chamber nozzles serve to establish layers of air between the raised card and the adjacent cards which prevent surface scratching during the removal operation. This feature is especially desirable when the file cards carry chips of microfilm in windows or cutout areas, which are particularly susceptible to scratching damage. When the card is drawn through the drive roller pair 20 microswitch 38 opens once more which retransfers the switches 126, 128, and 130. Solenoid 86 is then re-energized to withdraw the extended stripper blade and the card removal operation has been completed. When a card is completely removed from the deck of cards 10, its upward travel is stopped by a movable gate (not shown) which in turn actuates a microswitch (not shown) indicating that the selected card is completely removed from the file. This microswitch in turn controls a relay (not shown) causing the switches 118, 120 to be retransferred into engagement with their A contacts. For purposes of this invention, it may be assumed that the switches 118, 120 are returned to their initial settings manually upon complete removal of the selected card from the file. The subsequent retransfer of switches 118 and 120 de-energizes the drive motor windings 96 and 98 and restores the control circuit to its original condition as shown in FIGURE 7.

It should be borne in mind that the above sequence of events takes place in a very short period of time. The extension of the stripper blade, the braking of the disc 64 and the incremental reversal of the drive motor all occur almost simultaneously in response to the raising of a desired file card into the drive rollers. When the raised card is backed off slightly to break any contacts or wedge conditions the selection fingers are immediately withdrawn and the card is then driven out of the deck and rapidly transported to the viewing station. The parameters of capacitor 122 and resistor 134 are chosen so that transistor 114 is merely pulsed into conduction for a brief interval sufficient to prevent the incremental reversal and finger withdrawal operations to be carried out.

Considering now the situation where two or more file cards enter between the drive rollers at the same time, due to improper edge coding, erroneous filing, faulty selection finger operation, static adhesion, etc. the additive thickness of the cards will actuate both the microswitches 38 and 40 as shown in FIGURE 6. The actuation of microswitch 38 causes the transfer of switches 126, 128 and 130, as described above. The additional actuation of microswitch 40, however, energizes a relay, not shown, which retransfers the switches 118 and 120 back into engagement with their A contacts as shown in FIGURE 7. Switch 118 now completes a circuit path through stripper plate coil 86A and the B contact of switch 128, which maintains the solenoid 86 energized and holds the stripper blade in its retracted position. This is essential since card damage would almost certainly result if two or more raised cards were attempted to be forced into the slot 76 in the blade. At the same time, the retransfer of switch 120 completes a circuit path from the positive D.C. power supply to the base of NPN transistor 116 through the B contact of switch 130 and a resistor 136. This forward biases the base-emitter junction of the transistor and renders it heavily conductive, which in turn energizes the relay coil 112. The associated switch arms 112A and 112B of the coil 112 are now transferred into engagement with their B contacts and effect a reversal of the transport mechanism drive motor 54. When switch 120 is retransferred into engagement with its A contact, it also removes the power supply from relay coils 108 and 110, thereby preventing the latter from transferring their associated switch arms and maintaining solenoid 70 energized to keep the brake shoe retracted. The drive motor 54 now rotates continuously in a counterclockwise direction which completely returns the raised cards to the deck 10, thereby avoiding any card or equipment damage that might result if doubled cards were driven further into the transport mechanism. The plenum chamber (not shown) air has remained on throughout the complete reversal sequence, which further assists in the card return and prevents surface scratching, as described earlier. The plenum chamber air is not required, however, to return the doubles to the deck 10.

Once the cards leave the drive roller pair 20, the microswitches 38 and 40 are de-actuated which, with the exception of switches 118 and 120, leaves the control circuit in the condition shown in FIGURE 7. Since the system is still in the pocket scanning mode, switches 118 and 120 are restored to their transferred positions, which re-establishes the clockwise rotation of the drive motor and readies the system for a further card removal attempt.

While the invention has been described in connection with a preferred embodiment thereof, many minor changes and variations in the structure and functioning of same will be readily apparent to those skilled in the art. Such changes are to be considered as being within the spirit and scope of the invention, which is limited only as defined in the following claims.

What is claimed is:

1. In a card filing system of the type having means for removing a selected file card out of a deck of such cards, an apparatus for preventing the withdrawal of more than the selected card, comprising:

(a) stripping means reciprocably mounted adjacent one side of the deck of cards and having a slot therein wider than the thickness of one card but narrower than the thickness of two, (b) sensing means for detecting the presence of a selected card, and (c) motive means responsive to the sensing means for extending the stripping means into the path of travel of the selected card, whereby the selected card enters the slot and may be completely withdrawn from the deck therethrough while the remaining cards in the deck are prevented from being withdrawn by the stripping means.

2. An apparatus as defined in claim 1 wherein:
(a) the stripping means is a blade member and the slot is longitudinally cut in one end thereof,
(b) the slot has a divergent or funnel-shaped opening to facilitate the entry of a selected card, and
(c) the blade member is loosely mounted so that the slot may transversely align itself with a selected card during the extension of the blade member into the path of travel of the selected card.

3. An apparatus as defined in claim 1 wherein:
(a) the sensing means is a microswitch, and
(b) the motive means is an electric solenoid.

4. An apparatus as defined in claim 1 further including:
(a) additional sensing means for detecting the simultaneous removal of two or more cards,
(b) a reversible transport mechanism for conveying cards to and from the deck, and
(c) means responsive to the additional sensing means for causing the transport mechanism to return all cards to the deck and for preventing the stripping means from being extended over the top of the deck.

5. An apparatus as defined in claim 4 wherein:
(a) the transport mechanism includes an idler roller journaled for rotation in a pivotally mounted block,
(b) the sensing means and additional sensing means are microswitches, and
(c) they are individually actuated in response to the pivoting of the block beyond separate predetermined limits under the influence of a removed card or cards.

6. In a card filing system of the type having one or more storage pockets each containing a deck of file cards individually coded by means of notches cut into their upper edges and including selectively extensible fingers for restraining all but a desired card from being raised out of a deck by ejection means, and apparatus for ensuring that a desired card is fully disengaged from any extended fingers before the latter are retracted to permit the complete removal of the card, comprising:
(a) a reversible transport mechanism for conveying cards to and from a pocket,
(b) sensing means for detecting the raising of a card into the transport mechanism, and
(c) control means responsive to the sensing means for incrementally reversing the transport mechanism to partially return the raised card to the pocket, whereby any wedge conditions or contacts that may exist between the fingers and the notches in the raised card are broken and the fingers may be retracted without restraint.

7. An apparatus as defined in claim 6 wherein the control means includes:
(a) a reversible drive motor for the transport mechanism having a pin extending radially from its armature shaft,
(b) a brake disc rotatably mounted on the shaft and having an axially extending pin adapted to cooperate with the radially extending pin,
(c) a solenoid operated brake shoe for selectively restraining the rotation of the brake disc, and
(d) circuit means for simultaneously reversing the drive motor and operating the solenoid in response to the detection of a raised card by the sensing means, whereby the drive motor rotates in a reverse direction for approximately one revolution until the radially extending pin strikes the restrained axially extending pin, thereby causing the transport mechanism to partially return the raised card to the pocket.

8. In a card filing system of the type having one or more storage pockets each containing a deck of file cards individually coded by means of notches cut into their upper edges and including selectively extensible fingers for restraining all but a desired card from being raised out of a deck by ejection means, and apparatus for facilitating the removal of a raised card, comprising:
(a) a reversible transport mechanism for conveying cards to and from a pocket,
(b) sensing means for detecting the raising of a card into the transport mechanism,
(c) a blade member having a longitudinal slot in one end thereof reciprocally mounted adjacent the top of the pocket, the slot being only wide enough to accommodate a single card,
(d) control means responsive to the sensing means for incrementally reversing the transport mechanism to partially return the raised card to the pocket, whereby any wedge conditions or contacts that may exist between the fingers and the notches in the raised card are broken and the fingers may be retracted without restraint to permit the complete removal of the card, and
(e) motive means responsive to the sensing means for exending the one end of the blade member over the top of the pocket, whereby the raised card enters the slot and may be completely withdrawn from the pocket therethrough while the remaining cards in the pocket are prevented from being withdrawn by the blade member.

9. An apparatus as defined in claim 8 further including:
(a) additional sensing means for detecting the simultaneous raising of two or more cards, and
(b) means responsive to the additional sensing means for causing the transport mechanism to return all raised cards to the pocket and for preventing the blade member from being extended over the top of the pocket.

10. An apparatus as defined in claim 9 wherein:
(a) the transport mechanism includes an idler roller journaled for rotation in a pivotally mounted block,
(b) the sensing means and the additional sensing means are microswitches, and
(c) they are individually actuated in response to the pivoting of the block beyond separate predetermined limits under the influence of a raised card or cards.

11. An apparatus as defined in claim 9 wherein:
(a) the slot has a divergent or funnel-shaped opening to facilitate the entry of a raised card, and
(b) the blade member is loosely mounted so that the slot may transversely align itself with a raised card during the extension of the blade member over the top of the deck of cards.

12. An apparatus as defined in claim 9 wherein the control means includes:
(a) a reversible drive motor for the transport mechanism having a pin extending radially from its armature shaft,
(b) a brake disc rotatably mounted on the shaft and having an axially extending pin adapted to cooperate with the radially extending pin,
(c) a solenoid operated brake shoe for selectively restraining the rotation of the brake disc, and
(d) circuit means for simultaneously reversing the drive motor and operating the solenoid in response to the detection of a raised card by the sensing means, whereby the drive motor rotates in a reverse direction for approximately one revolution until the radially extending pin strikes the restrained axially extending pin, thereby causing the transport mechanism to partially return the raised card to the pocket.

References Cited by the Examiner

UNITED STATES PATENTS

| | | | |
|---|---|---|---|
| 3,225,770 | 12/1965 | Lasley et al. | 129—16.1 |
| 3,228,130 | 1/1966 | Novak | 129—16.1 X |

JEROME SCHNALL, *Primary Examiner.*